Figure 1:
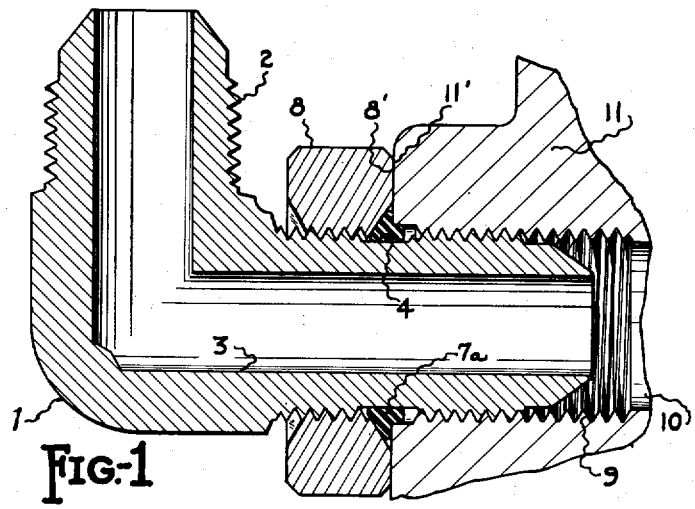

Feb. 29, 1944.  N. BASHARK  2,343,235
UNIVERSAL PIPE FITTING
Filed Nov. 28, 1941

INVENTOR.
NICHOLAS BASHARK
BY
ATTORNEYS

Patented Feb. 29, 1944

2,343,235

UNITED STATES PATENT OFFICE 2,343,235

UNIVERSAL PIPE FITTING

Nicholas Bashark, Dayton, Ohio, assignor to The Weatherhead Company, Cleveland, Ohio, a corporation of Ohio Application November 28, 1941, Serial No. 420,828

6 Claims. (Cl. 285—55)

This invention relates to fluid couplings or fittings, and more particularly to fittings of the class which do not depend upon tapered pipe threads for establishing a fluid tight joint. This invention comprehends joining straight threaded fluid conductors in a locked mechanical relationship on the one hand and in fluid and pressure tight relationship on the other hand. This invention also relates to the coaction between fluid conducting members and associated parts by virtue of which fluid seals are established without impairing the mechanical joint between them, and permitting a wide range of angular adjustment between the members to be joined as well as permitting a determinable longitudinal relationship therebetween.

It is among the objects of my invention to provide a fitting or connection of very simple and economical construction which, without impairment or destruction in the parts to be joined, is capable of resisting leakage against a wide range of fluid pressures both positive and negative. Another object is to provide a simple economical durable fitting capable of maintaining a fluid tight connection as against high pressures of the order of one to several or more thousand pounds per square inch. A further object is to provide such a fitting capable of repeated connection and disconnection without impairment. A further object is to provide in such a fitting a readily renewable sealing member which, in the event of its deterioration, age, wear or injury, can be very readily and economically replaced. Other objects include the provision of a fitting in which mechanical locking and/or fluid sealing can be established between the members to be connected in any desired angular relation throughout 360° with equal facility and equal effectiveness. A further object is to provide a fitting in which the parts to be joined may be joined in fluid tight and/or mechanically locked relationship in predetermined or predeterminable longitudinal relation. Other objects include the provision of a fitting or connection, the utility of which extends to a wide variety of materials and permits a wide selection and choice of materials, the specific utility of which in relation to the fluids to be conducted and/or the requirements of the weight, strength and the like may be readily accommodated and utilized. Another object is to provide a coupling having good fluid conducting characteristics particularly in freedom from obstruction to flow and freedom from loss of head or pressure therethrough or thereacross. Another object is to provide a coupling in which the functions of effecting the fluid seal are so separated from the functions of locking the parts together and/or forming the mechanical connection, that functional interference is avoided. A further object is to carry out these functions independently in a structural organization in which common structural parts participate in the fluid sealing function as well as in the mechanical connection and/or locking function without impairing either function and without overburdening or injuring any of the parts.

Other advantages, objects and results will appear from the following description of certain preferred forms of my invention, reference being made to the accompanying drawing. The essential characteristics are summarized in the claims.

Figure 3:
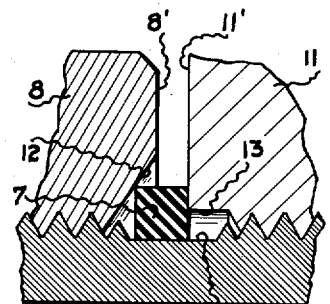
Figure 2:
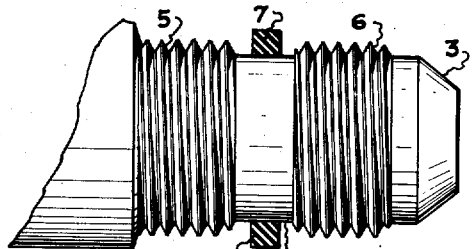
Figure 4:
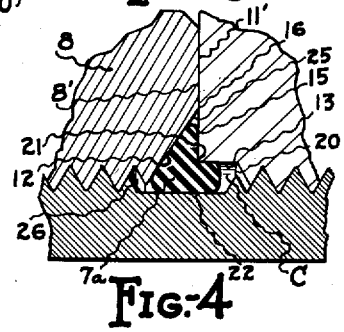
Figure 5:
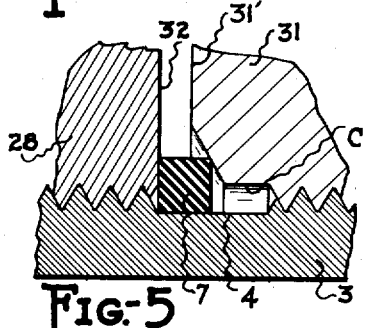
Figure 7:
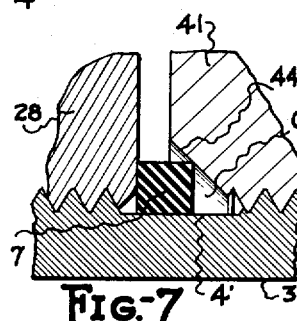
Figure 9:
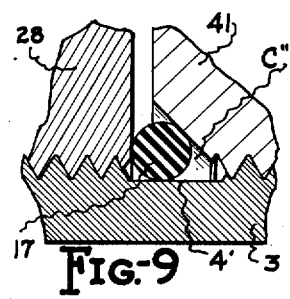
Figure 6:
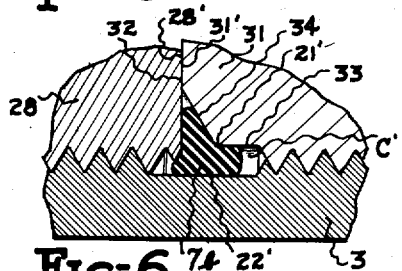
Figure 8:
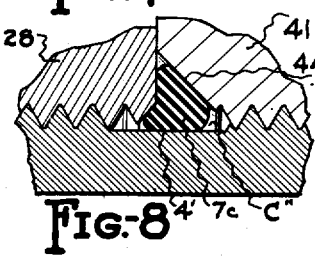
Figure 10:
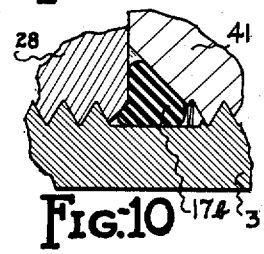

In the drawing, Figure 1 is a sectional view of my assembled coupling with the male member comprising one leg of an elbow entering a female body member or boss, of which only a fragmentary portion is shown; Figure 2 is an external view of the male member and the sealing washer or gasket associated therewith; Figure 3 is an enlargement of parts of my coupling shown in Figure 1 adjacent the sealing washer as positioned prior to locking and sealing; Figure 4 is a view similar to Figure 3 showing the parts in the position also shown in Figure 1 in the locked and sealed relationship; Figure 5 is an enlarged fragmentary view corresponding to the view of Figure 3 showing a modified form of the coupling parts in relation preliminary to locking and sealing; Figure 6 is a view corresponding to Figure 5 showing the parts in locked and sealed relationship; Figure 7 is a view similar to Figures 3 and 5 showing a further modification with the coupling parts in the relationship prior to locking and sealing; Figure 8 is a corresponding view showing the parts in locked and sealed relationship; Figure 9 is a view similar to Figures 3, 5 and 7 showing a further modification with the coupling parts in relation prior to locking and sealing; and Figure 10 is a view corresponding to Figure 9 with the parts in locked and sealed relation.

In Figure 1 of the drawing I have shown the male and female members of my fitting or coupling as contained in a male elbow 1 and a female boss or body 11. The elbow illustrates one of the advantages of my invention of permitting the parts to be assembled in coupled relationship in any desired annular relation through 360°. The free end 2 of the elbow is shown externally threaded and otherwise formed to comprise a part of the well-known S. A. E. coupling, merely as illustrative of a form of connection to which external fluid conducting means may be conveniently connected. The other end of the elbow, which comprises the male member 3 of a preferred form of my invention, is externally threaded as at 5 and 6, see also Figure 2, and the threaded portions are separated by a smooth cylindrical surface 4, which may be formed prior to threading by using an appropriately shaped pre-threadforming tool when giving the finished pre-threaded contour to the body of the male member, or by turning down the threads after threading the whole member. In either event I prefer that this surface be substantially devoid of at least non-circular tool marks, ridges or grooves, and that the portions of the threads immediately adjacent the area 4 be chamfered a little to avoid high sharp edges at the boundaries of the surface 4. The extreme end of this portion of the fitting preferably has a tapered nose following the conformation of the well-known S. A. E. fitting above mentioned, so that this part of the elbow may be used for that purpose as well as and/or in addition to the purpose of the instant invention.

The diameter of the smooth surface 4 is preferably maintained at a maximum consistent with its external smoothness whereby to maintain the strength of the male member, and the width or axial dimension of the surface 4 is preferably maintained at a minimum consistent with the functions to be performed by and in relation to it to be present described; it being apparent that unnecessary width of the surface 4 adds unnecessary length to the whole fitting. The longitudinal extent of the threaded portions 5 and 6 is preferably also kept at a minimum consistent with the ultimate desired strength of the fitting in keeping with the wall thickness and strength of threads and other elements to be proportioned in relation to the duty or service required, material employed, and the circumstances of use.

Upon the smooth surface 4, as shown particularly in Fig. 2, there is seated an annular gasket or washer 7 upon which falls largely the duty of maintaining the fluid-tight seal between the members to be coupled as will more fully appear below. Suffice it to say at this point that I prefer that this sealing member 7 be of a fluid impervious elastic and yielding rubber-like material, which may be conveniently stretched to be drawn over the threads 6 to the smooth area 4, and will in that position hug that surface with some appreciable snugness. As shown in Figure 2 the sealing member 7 may be of substantially square cross section standing about twice the height of the adjacent threads, and also about half the width of the smooth sealing surface 4. While these proportions and dimensions are illustrative and have been found by me to be practicable, the factors influencing the choice of the material, shape and size of these parts will be more fully explained below in conjunction with the function and mode of operation thereof.

As shown also in Figure 1, a lock nut 8 is preferably carried by the threads 5 and is intended to react directly against the end face 11' of the body of the female member as at 8' to hold the male member in fixed locked relationship to the female member when the parts are assembled.

The female member, while shown in the form of a boss or thickened body 11, may, of course, take any convenient external form, and has a bore 10 having straight internal threads 9 of ample length to receive the male threads 6. The open end of the female member offers the locking surface 11' engageable with the locking surface 8' of the nut 8.

As shown more clearly in Figures 3 and 4, in this form of my coupling, the nut 8 also has a conical undercut or countersink comprising the surface 12 disposed oppositely to the recess or counterbore 13 in the female member. In the arrangement here shown the conical surface 12 preferably lies at about 60° to the axis of the coupling. As shown in Figure 1 the nut 8 may be countersunk on both sides to avoid delay or errors in assembly. Other forms of these opositely disposed surfaces and/or undercut or counterbored surfaces are shown in other figures of the drawing to which reference will be made below. In the forms shown in Figures 1, 3 and 4, I prefer that the counterbore 13 be of considerably smaller diameter than the external diameter of the sealing washer 7, see Figure 3, so that when the lock nut 8 is advanced on the threads 5 toward the female member 11, the sealing washer 7 will be squeezed and deformed, more or less as shown at 7a in Figure 4, part of the washer being forcibly urged into the counterbore 13, and the other parts deformed more or less as shown.

As the lock nut 8 or equivalent advances from the position shown in Figure 3 to that shown in Figure 4, it will be seen that in the locked position, Figure 4, the washer 7—7a is contained within a closed annular cavity C formed by the surface 12 of the nut, the surface 4 of the male member, the walls of the counterbore 13, and the portion 15 of the end face of the female member which lies radially inward of the point 16 where the nut engages the end face of the female member. This annular cavity C is closed mechanically, but remains subject to fluid entrance and egress along the threads 5 and/or 6 as well as between the faces 8' and 11' which are not necessarily fluid tight. It will be understood that by the action of the lock nut 8 or equivalent in its bearing upon the open end of the female member that locking pressures are developed between the faces 8' and 11', and upon the threads 5 and 6 and the corresponding female threads in the lock nut 8 and female member 11. It will also be observed, particularly as illustrated in my preferred form shown in Figure 4, that the deformed washer 7a has not filled the cavity C, and, as I prefer, the tendency of the washer 7 to hold its own shape, i. e., its elasticity and/or resilience, is such that the washer has not tended to flatten out and flash radially between the surfaces 8' and 11', whereby to interfere with the mechanical lock between the members, nor has it flashed or extruded into the zone of the threads.

The preferred proportioning and arrangement of the sealing washer 7 in relation to the cavity C and the axial length of the surface 4 along with the character of the washer, keeps the washer substantially out of contact with at least the male threads, prevents mutilation of the washer by or between the threads and enhances the repeated use of the washer for numerous sealings and openings of the joint. One of the considerations in determining the width of the surface 4, i. e., its axial dimension, is that of making it wide enough to prevent the washer and/or any of its deformed portions from resting upon the sharp edge of the threads or being caught between threads, whereby to be cut or shredded deleteriously.

As viewed particularly in Figure 4, the normal tendency of leakage is that fluid will work between the threads 6 and 9, and enter that open portion of the cavity C adjacent those threads as at about point 20, so that at that point there will be built up a fluid pressure substantially equal to the pressure of fluid within the bore of the fitting. It is to be noted that this pressure bearing on the washer 7a leftwardly, as viewed in Figure 4, tends to augment the internal stress in the washer, and tends to augment the pressures exerted between the washer and the adjacent surfaces of the cavity C, particularly in and about the point 21 at the entrance to the counterbore and the opposite point 22 on the smooth surface 4 where, as I believe in this form of my invention, high sealing pressures are initially developed since the material of the washer is subjected to a great if not its greatest deformation and stress adjacent these points. Similarly, if negative pressures are established in the bore of the fitting relative to external pressures, the tendency of extraneous fluid to enter the fitting will cause fluid pressures to be created in the parts 25 and 26 of the cavity C, fluid tending to enter between the locking surfaces 8' and 11' and adjacent the threads 5 respectively. Here also the pressures will similarly tend to further stress the material of the deformed washer 7a and tend to increase sealing pressures between the washer and the adjacent surfaces of the cavity. Although I have shown the surfaces of the deformed washer 7a facing the portions 20, 25 and 26 of the cavity C as being convex, I am aware that it might well be theoretically and perhaps practically advantageous to shape and construct the washer and/or the washer and cavity so that one or more of these surfaces would take a concave form whereby to cause the fluid pressure at these points to act more directly in increasing the sealing pressures between the washer and adjacent walls of the cavity.

As mentioned above, I have found that when the surface 12 is inclined at about 60 degrees to the surface 4, that the results are quite satisfactory, successfully resisting fluid pressures as high as 8000 lbs. per square inch under test. My experience has been that the inclination of this surface best serves its purpose when it is such that the components of action and reaction between this surface, the other surfaces of the cavity and the sealing washer tend to strongly force a portion of the washer into the counterbore without tending to overly elongate the washer radially outward to the surfaces 8' and 11' nor longitudinally nearer the neighborhood of the threads than about as shown in Figure 4.

While I have pointed out that the deformed washer 7a does not, as I prefer, completely fill the cavity C, I believe that the efficacy of the fluid seal and mechanical lock will persist even though this cavity is just about theoretically filled by the deformed washer when, but not before, the full desired mechanical lock is established between the members as by full engagement between the nut 8 and body 11. This presumes, of course, that the shape of the cavity and washer and the elasticity of the latter is such as to take substantially the precise shape of the cavity and not exceed the volume thereof to interfere with the mechanical lock between the coupling members per se. Preferring, as I do, to establish both a mechanical locking engagement between the members as well as a fluid seal therebetween, and preferring to be free from close dimensional tolerances in regard to the size of the washer and cavity, my preference is to make the washer of materially less volume than the closed cavity as illustrated in Figures 1, 4, 6, 8 and 10 herein.

Turning now more particularly to the shape and characteristics of the sealing washer 7, it will be seen as I have illustrated particularly in Figures 3 and 4, and in the following figures not yet specifically referred to, that I prefer that the sealing washer in its free position on the surface 4, which I call its idle position (albeit I prefer that the washer in this position be not literally idle since it preferably grips the surface 4 with some little snugness as, for example, by being expanded about 1% to 3% of its literally idle diameter), be of different shape from the closed cavity C into which it is forcibly confined.

I also prefer and desire that the material of the washer be such that it tends strongly to regain its original shape after it has been deformed thereby to react against the surfaces of the cavity C to develop sealing pressures therewith, particularly as these pressures are and/or may be augmented under the influence of the fluid pressure tending to leak through the cavity and building up as at the point 20 as above described. Moreover, I also prefer that the washer have such inherent elasticity and resilience that in its tendency to regain its idle shape it will come and go with the walls of the cavity in which it is confined as those walls expand and contract under the influences of wide changes in temperatures and pressure to which the fitting may well be subjected as in use on airplanes going from low to high altitudes and the like. I also prefer that the gasket be elastic enough to be readily stretched over the threads 6 without exceeding its elastic limit and be capable of regaining substantially its original shape and resilience after having been deformed as at 7a, at least if not too long confined in that shape or otherwise subjected to so-called ageing conditions therein.

Rubber having a Durometer hardness of about from 50 to 60 is a material which I have found suitable for the washer 7 under various conditions of service. I have also used rubber and rubber compounds having qualities ranging among those found in rubber bands and garden hose washers. It is well known that rubber has the sometimes undesirable quality of tending to swell or "grow" when exposed to gasoline or other petroleum derivatives and other fluids. Various well known "synthetics" or so-called synthetic rubbers or substitutes such as buna rubber, perbunan, isoprene, neoprene, thiokol and the like possess the characteristics of hardness, elasticity and resilience above described, and have little or no tendency to "grow" when exposed to the fluids which cause rubber to grow. These synthetics have been quite successfully used by me in the sealing washers herein described. It may be noted, however, that the tendency of the washer to "grow" or swell is not necessarily or wholly derogatory to the practice of my invention. On one hand, even when using a rubber washer for sealing such fluids as oil or gasoline under pressure, the fluid entering the cavity C at the point 20 contacts and wets only the limited area of the deformed washer 7a exposed in that portion of the cavity. That part of the washer being highly compressed is much restricted in its ability to "absorb" such fluid, so that as a practical matter its "growth" under such conditions is quite limited. On the other hand, after the joint is once locked and sealed and put into use, actual "growth" of material as above described does not substantially impair the efficacy of the seal or the utility of the coupling, and may in fact augment its utility. I recognize, of course, that if the "growth" be such that the sealing washer is found to be materially enlarged when the coupling is opened, or if the washer has lost its desired characteristics of elasticity and resiliency by virtue of its "growth" or has had its shape materially changed by such growth, so that by any one or more of these things its mode of operation in its coaction with the walls of the cavity during a subsequent resealing is changed or impaired so as to prevent an effective resealing, that a new and fresh washer will have to be substituted. One of the advantages of my invention is, however, that even under these circumstances such a substitution can be readily made, and the coupling thereby restored to its normal efficiency and utility.

Another characteristic of the sealing washer 7 in relation to the cavity C which I have found preferable is that the size of both these things be relatively small in relation to the size of the fitting. For example, I have indicated above that the washer 7 in its square form stand about twice the height of the threads of the members to be joined. Considering the height of the thread as unity, the cross sectional area of the washer will, as I prefer, be about 4 square units, and the cross sectional area of the cavity C, depending somewhat upon the depth of entry of the male member into the female member and hence the relative position of the surface 4 with respect to the other walls of the cavity, will preferably comprise from about four and one-half to five and one-half such square units of area. Over and above the matter of economy incident to smaller washers and cavities, I believe another advantage of the small sealing washer in the small cavity lies in the fact that greater relative deformation of the washer with consequent higher and more uniformly distributed internal stresses can be developed in the small washer per turn of the lock nut 8, as shown in Figures 3 and 4. Correspondingly, to develop equally high unit sealing pressures between the sealing washer and the walls of the cavity, smaller gross pressures need be exerted to deform the washer in the smaller sizes than in the larger sizes. As the washer is being deformed and impressed into the cavity C, the unit pressures at certain points or areas of contact between the washer and adjacent walls of the cavity will tend to be higher than other points, the higher pressures tending to be concentrated in the points or areas of greatest internal stress developed in the washer. In smaller washers I believe that these higher internal pressures are more fully and directly transmitted to opposite portions of the washer and opposite sealing surfaces as for example from the point 21 to the point 22, as illustrated in Figure 4, where I prefer that maximum sealing pressures be developed rather than on the area of contact between the washer 7a and the surface 12, where high unit pressures are not ordinarily as desirable as at or about the points 21 and 22 particularly where the "leaking" pressure builds up at the point 20 in the cavity C.

Those skilled in the art will appreciate that as a practical matter the sealing washer cannot be reduced to an absurdly small size with relation to the size of the threads of the members to be coupled, since a point is quickly reached where small differences in mechanical tolerances determining the size of the washer and the cavity C will begin to play too large a part in measuring the resulting deformation of the sealing washer and consequent sealing pressures, thus risking impairment of the mode of operation and results which I obtain by my invention.

Although I have referred to rubber-like materials as being preferable for use in the making of the sealing washer 7, I do not mean to disclaim or exclude other materials, whether mixed, laminated or combined, which, in the same or other appropriate shapes in the same or appropriately modified relation to the shape of the cavity C, have substantially the same mode of operation and perform substantially the same functions as the washers herein specifically described.

Turning now to the modified form shown in Figures 5 and 6 and referring to similar parts by similar reference characters, I there employ substantially the same male member 3 with substantially the same smooth face 4 carrying substantially the same square section annular sealing washer 7, but in this instance the lock nut 28, otherwise similar to the nut 8 above described, has its face lying substantially wholly in a radial plane as at 32, excepting perhaps only for a nominal chamfer near the female threads. In this form the female member 31 may be in all respects similar to the female member 11 above described, excepting that adjacent the counterbore 33 the female member has a conical countersunk surface 34, so that the washer 7 as it is forced into the cavity C' is deformed somewhat differently, taking the shape 7b as shown in Figure 6. The leftward wall of the washer remaining substantially straight and vertical as shown, is elongated somewhat in height, and by virtue of the slope of the wall 34 and its somewhat funnel-like effect in guiding the material of the sealing washer into the counterbore 33 of the cavity C', tends to displace more of the washer into the counterbore. Generally speaking, the mode of operation is substantially the same as that above described, albeit I believe that since the deformation is not quite as radical, particularly in and about the points 21' and 22' as compared with the points 21 and 22 of Fgiure 4, that unit sealing pressures at these points do not tend to become quite as high as in the forms shown in Figure 4. Since I am able, however, to obtain quite satisfactory sealing pressures in this form, I described it herein because it has the advantage in commercial practice of using a standard shape lock nut, not recessed as at 12 in Figures 3 and 4, and also having thereby a relatively greater threaded area compared with its gross thickness. In this form as in the form above described, the lock nut 28 obtains a mechanical locking bond with the female member 31 along the surface 28' of the nut bearing upon the surface 31' of the end of the female member.

In Figures 7 and 8, another modification is shown in which a similar male member 3 with a similar smooth surface 4', carrying a similar washer 7 and a lock nut 28 similar to the lock nut 28 above described, coacts with a female member 41 differing from the female members above described, principally in the absence of a counterbore as such, and merely having a conical countersunk face 44 against which one corner of the washer 7 first contacts as the lock nut is advanced on the threads of the male member. In response to the action similar to that above described, the sealing washer is deformed and compressed into the form substantially as shown in the Figure 8 at 7c, the sealing washer again not quite completely filling the cavity C", and providing a fluid seal in the manner above described having perhaps somewhat smaller maximum unit sealing pressures against the surfaces of the cavity C", but withal forming a seal capable of resisting leakage against high fluid pressures, positive as well as negative. In this form there is also preserved a stout mechanical lock and bond between the members being coupled.

Whereas I have indicated above that I prefer that the inclined surfaces 12 and 34 preferably be pitched at about 60° from the axis of the coupling and/or the surface 4 of the male member, in the forms shown in Figures 7 and 8 I prefer that the slope of the conical surface 44 be somewhat flatter, as for example about 45° with respect to the axis of the coupling. It may be noted in passing that in this form the cavity C" is somewhat smaller in its axial dimension than in the forms above described, and that correspondingly the width of the surface 4' may also be somewhat smaller with the advantage that the over-all length of the coupling may be shortened correspondingly with some little advantage in compactness.

A further modification is shown in Figures 9 and 10 in which the male and female parts may for the sake of illustration be regarded as precisely the same as shown in Figures 7 and 8, the point of modification being illustrated in the shape of the sealing washer 17 here shown as round in cross section, and like the preceding sealing washers of similar material and comprising preferably an annular ring resting on the surface 4' of the male member 3, and being confined between the nut 28 and the female member 41 within the cavity C". The deformation of the round sealing washer in this form is shown at 17b in Figure 10. This coupling is not substantially different in function, mode of operation or results from that described above, particularly in Figures 7 and 8. I seek to illustrate the same common characteristics in that the "idle" form of the washer 17 is sufficiently different from the ultimate shape of the closed cavity C" to bring about substantial deformation of the washer with consequent internal stresses stresses and yielding reaction against the walls of the cavity whereby to develop high unit sealing pressures thereagainst, at least under the influence of the fluid pressure bearing on the exposed face or faces of the deformed sealing member as fluid pressure tends to leak through the cavity against the opposition of the sealing member. It will also be understood that although I have illustrated the round sealing washer 17 only in conjunction with the female member lacking the counterbore, which is shown in Figures 3 to 6 inclusive, that the round form of substantially the same cross sectional area as the square form therein illustrated may be substituted and used with substantially the same function, mode of operation and results.

In illustrating sealing washers of square and round cross sectional forms, I have had in mind certain considerations which will guide those skilled in the art in their selection of various other forms within the spirit of my invention. Both the square and the round cross sectional forms are "fool-proof" in the sense that they always tend to naturally take a proper position on the surface 4 or 4' after having been drawn or stretched over the threads 6 of the male member to their so-called idle position on the surface 4.

Generally speaking, the square or rectangular form is preferred because of the relative ease and economy with which it can be made, particularly when employing the rubber-like substances which I prefer to use as the material for this member. The square or rectangular cross sectional forms of sealing members may be die cut from cured sheet material, or may be sheared from cured tubular stock without further shaping, molding or curing. As I am presently advised, sealing washers of the round cross sectional form might well have to be molded in such forms and cured therein with rather more expense than attends the provision of a square or rectangular form. Similarly, other forms which are neither square nor rectangular tend generally to evolve more expensive and involved processes of manufacture, and for that reason particularly they have not been illustrated as preferred forms, albeit I recognize, and those skilled in the art will recognize, that numerous cross sectional forms of such washers will function satisfactorily within the precepts of my invention.

From the above description of the several forms of my invention herein illustrated, the factors bearing on the width, i. e., the axial dimension of the surfaces 4 and 4' of the male member, can be generally summarized at this point. First, as above mentioned, it will be appreciated that any unnecessary width of this surface unnecessarily to the length of the fitting as a whole, and where the width of this smooth area exceeds the longitudinal extent of the threads of the lock nut, some little awkwardness might attend the threading of the lock nut from the threads 6 over to the threads 5. I prefer, however, that the width of the smooth area of the male member exceed the width, i. e., the corresponding axial dimension of the sealing member, by an amount which permits the free functioning of the sealing member as above described without substantial interference from the male threads 5 or 6 in any position of at least 360° angular movement of the male member with respect to the female member after the threads 6 are substantially fully engaged in the complementary threads 9 of the female member. In this way particularly where the male member is an elbow or other angle fitting, full threaded engagement may be had between the two members, and thereafter the male member may be turned to any of 360° of angular position as by screwing the male member further into the female member, whereby to maintain full threaded engagement, and still preserve under the sealing member a smooth bearing area for the purposes above described. Thus when a square section sealing member is employed, the width of the surfaces 4 or 4' preferably exceeds the width of the sealing member by at least the pitch of one thread. However, the kind of deformation of the sealing member in the finally closed cavity, compare the cavities C, C' and C", also bears on the preferable extent of the smooth surface of the male member which supports the sealing washer. Since I prefer that the washer be not forced into injurious contact with sharp edges of the male threads, it follows that the width of this surface should preferably not be substantially less than the greatest longitudinal dimension that the deformed washer has in contact therewith plus about the pitch of one thread. These general considerations apply to the round cross sectional form of sealing member in the same way that they apply to the square or rectangular forms. Where, as I prefer, the square cross sectional form has the length of its side about twice the height of the threads, then assuming the square and round cross sectional forms of washers have the same cross sectional area, the width of the flat surfaces 4 and 4' may for general satisfactory use vary from about three and one-half to four and one-half times the height of a thread to give any desired angular locked and sealed relationship within 360°, and by the same token to give about the pitch of one thread for longitudinal adjustment. Where the male member is not incorporated in an elbow or angular fitting, but is merely part of the straight fitting, angular adjustment naturally becomes of less importance, and longitudinal adjustment, or at least the ability to locate the male member in a predetermined longitudinal relation to the female member, is conveniently accomplished through my invention especially as distinguished from the limitations inherent in fittings employing tapered pipe threads. From the point of view of obtaining a wider longitudinal adjustment as between different fully locked and sealed engagements of the members, the range of selectable positions may, of course, be increased by increasing the width of the smooth area on the male member, having in mind that if the width of that area materially exceeds the widths hereinabove described, that the threaded length of the lock nut and/or the longitudinal dimension of the lock nut should be correspondingly increased.

Although I have described in some detail the material of which I prefer to form the elastic and resilient sealing member of my coupling, I should perhaps add that I have successfully used such sealing members in couplings in which the other coacting parts were made of metals such as aluminum, brass and steel. While the threaded relation of the lock nut or member to the male member and its specific coaction with the female member have the advantages above described, other relationships not substantially altering the mode of operation, functions and results of my invention may be employed without departing from the spirit thereof.

This application contains subject matter concerning my invention which is also contained in my copending application Serial No. 395,017 filed May 24, 1941, and as to all common subject matter the instant application stands as a continuation in part of my copending application.

While I have illustrated and described a preferred and certain modified forms of my invention, various modifications, changes and improvements will occur to those skilled in the art without departing from the spirit or precepts thereof, and I do not care to be limited to the particular forms herein specifically illustrated and described, or in any manner other than by the claims appended hereto when construed to embrace the equivalents to which they are entitled in view of my advance from the state of the prior art.

I claim:

1. A coupling comprising a male member having two threaded areas separated by a smooth unthreaded area, a lock nut in threaded engagement with one of said threaded areas, a sealing member encircling said unthreaded area, and a female member having an internally threaded bore for receiving the other of said threaded areas of said male member, at least parts of the juxtaposed faces of said lock nut and female member forming, when said nut and member are in contact, faces of an annular cavity of which said unthreaded area also forms a face, and which cavity contains said sealing member, said sealing member being forcibly confined in said cavity as said lock nut advances and contacts with said female member and being deformed and forcibly distorted in its confinement from its original shape to a different and stressed shape and having sufficient elasticity to forcibly react against the walls of said cavity to develop sealing pressures thereagainst while filling less than the whole volume of said cavity, said sealing member resisting contact with the faces of said cavity at least adjacent the point of contact with said lock nut and female member at least in the absence of fluid pressure exerted thereupon.

2. A coupling comprising a male member having two straight threaded areas separated by a smooth unthreaded area, a lock nut in threaded engagement with one of said threaded areas and having a smooth face adjacent said unthreaded area, an elastic gasket encircling said unthreaded area, and a female member having an internally straight threaded bore for receiving the other of said threaded areas of said male member and flared and counterbore surfaces at the open end thereof, the face flared and, counterbore surfaces and smooth area forming, when said nut and female member are in contact, a closed annular cavity with an inwardly facing angled edge containing said gasket, said gasket being forcibly confined in said cavity and sharply engaged by said edge and being deformed in its confinement from its original shape and having sufficient elasticity to forcibly react against the walls of said cavity to develop sealing pressures thereagainst while filling less than the whole volume of said cavity.

3. A coupling comprising straight threaded male and female members in threaded engagement, a male member having a smooth unthreaded area the diameter of which is substantially equal to the minor diameter of the threads and disposed adjacent to the last thread to enter the threads of the female member, the female member having adjacent its open end a smooth unthreaded area the minimum diameter of which exceeds the major diameter of the threads, a locking member interacting between said male member and said female member adjacent to the said smooth area thereon, said locking member having a smooth area juxtaposed in relation to the said smooth areas of said male and female members and defining when lockingly engaged with said male and female members an annular cavity having an axial cylindrical face and at least one face inclined thereto, and an annular resilient sealing washer of smaller volume than said cavity with its maximum cross sectional dimension not substantially greater than twice the height of the threads of said members and of different idle cross-sectional shape from the cross-sectional shape of said cavity and being deformed from its idle shape by the closing of said cavity and internally stressed by such deformation.

4. A fluid connector comprising a male member having angularly disposed fluid passages, said member containing one of said passages in a part having thereon two male straight threaded areas separated by a smooth, unthreaded area, a jam nut threaded on one of said threaded areas, a packing gasket encircling said unthreaded area, a female member having an internally straight threaded hole for receiving the other of said threaded areas, and an abutment portion on said female member adapted to be contacted by said nut so that said male member may be rigidly secured and tightly sealed to said female member with at least one other passage turned in any desired direction, one of the juxtaposed faces of said jam nut and female member being recessed and said juxtaposed faces with said smooth unthreaded area forming a smooth faced annular cavity when said jam nut engages said female member, said packing gasket being contained in said cavity and deformed and stressed by forcible contact with the walls thereof, but not completely filling the whole volume of said cavity and having sufficient elasticity to react against the walls thereof and develop fluid sealing pressures thereupon independently of the effect of fluid pressure in the first instance but with augmented sealing pressure when the pressure of fluid tending to escape through said cavity is exerted upon said gasket, said smooth unthreaded area exceeding the area of contact of said deformed gasket thereupon by an amount which permits sealing without contact between the sharp adges of said male threads and said gasket through substantially 360 degrees of angular positioning of said male member in said female member.

5. A joint comprising an internally threaded member and an externally threaded member in non-fluid-tight threaded engagement, said members having exposed smooth annular surfaces adjacent one end of the engaged threaded portions thereof, a third member carried by one of said first named members and being adapted to engage the other of said members fully and directly to lock said members in fixed relation to each other and having a smooth annular surface juxtaposed to the said surfaces of said first members, said smooth annular surfaces of said members forming an annular cavity at least two of the walls of which lie at a converging angle when said members are mechanically locked together, and an elastic fluid sealing member disposed in said cavity having a smaller volume than the volume of said cavity and being deformed between said converging walls in said cavity and reacting thereagainst by its tendency to resume its initial shape whereby to yieldingly maintain a fluid tight seal between said members prior to the imposition of fluid pressure thereupon.

6. A joint comprising a member having a bore, a second member interlockingly engaged in said bore, a third member carried by one of said first named members, said members being adapted to engage each other to lock said members in fixed relation to each other, each of said members having a smooth annular surface juxtaposed to form an annular cavity having a plurality of angularly related wall surfaces, and a sealing member contained in said cavity and exposed to fluid tending to leak through, said sealing member being elastic and resilient and being of different cross-sectional form than said closed cavity when not contained therein and being altered in form and internally stressed in its confinement in said cavity while not filling said cavity.

NICHOLAS BASHARK.

CERTIFICATE OF CORRECTION.

Patent No. 2,343,235.                                                   February 29, 1944.

NICHOLAS BASHARK.

It is hereby certified that error appears in the printed specification of the above numbered patent requiring correction as follows: Page 2, first column, line 31, for "present" read --presently--; page 5, first column, line 48, strike out "stresses"; and second column, line 30-31, after "unnecessarily" insert --adds--; page 7, second column, line 29, claim 6, for "through" read --therethrough--; and that the said Letters Patent should be read with this correction therein that the same may conform to the record of the case in the Patent Office.

Signed and sealed this 18th day of April, A. D. 1944.

Leslie Frazer (Seal)                                    Acting Commissioner of Patents.

threaded hole for receiving the other of said threaded areas, and an abutment portion on said female member adapted to be contacted by said nut so that said male member may be rigidly secured and tightly sealed to said female member with at least one other passage turned in any desired direction, one of the juxtaposed faces of said jam nut and female member being recessed and said juxtaposed faces with said smooth unthreaded area forming a smooth faced annular cavity when said jam nut engages said female member, said packing gasket being contained in said cavity and deformed and stressed by forcible contact with the walls thereof, but not completely filling the whole volume of said cavity and having sufficient elasticity to react against the walls thereof and develop fluid sealing pressures thereupon independently of the effect of fluid pressure in the first instance but with augmented sealing pressure when the pressure of fluid tending to escape through said cavity is exerted upon said gasket, said smooth unthreaded area exceeding the area of contact of said deformed gasket thereupon by an amount which permits sealing without contact between the sharp adges of said male threads and said gasket through substantially 360 degrees of angular positioning of said male member in said female member.

5. A joint comprising an internally threaded member and an externally threaded member in non-fluid-tight threaded engagement, said members having exposed smooth annular surfaces adjacent one end of the engaged threaded portions thereof, a third member carried by one of said first named members and being adapted to engage the other of said members fully and directly to lock said members in fixed relation to each other and having a smooth annular surface juxtaposed to the said surfaces of said first members, said smooth annular surfaces of said members forming an annular cavity at least two of the walls of which lie at a converging angle when said members are mechanically locked together, and an elastic fluid sealing member disposed in said cavity having a smaller volume than the volume of said cavity and being deformed between said converging walls in said cavity and reacting thereagainst by its tendency to resume its initial shape whereby to yieldingly maintain a fluid tight seal between said members prior to the imposition of fluid pressure thereupon.

6. A joint comprising a member having a bore, a second member interlockingly engaged in said bore, a third member carried by one of said first named members, said members being adapted to engage each other to lock said members in fixed relation to each other, each of said members having a smooth annular surface juxtaposed to form an annular cavity having a plurality of angularly related wall surfaces, and a sealing member contained in said cavity and exposed to fluid tending to leak through, said sealing member being elastic and resilient and being of different cross-sectional form than said closed cavity when not contained therein and being altered in form and internally stressed in its confinement in said cavity while not filling said cavity.

NICHOLAS BASHARK.

CERTIFICATE OF CORRECTION.

Patent No. 2,343,235. February 29, 1944.

NICHOLAS BASHARK.

It is hereby certified that error appears in the printed specification of the above numbered patent requiring correction as follows: Page 2, first column, line 31, for "present" read --presently--; page 5, first column, line 48, strike out "stresses"; and second column, line 30-31, after "unnecessarily" insert --adds--; page 7, second column, line 29, claim 6, for "through" read --therethrough--; and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.